United States Patent
Dawes et al.

(10) Patent No.: US 11,802,070 B2
(45) Date of Patent: Oct. 31, 2023

(54) SLOW COOLING OF OPTICAL FIBERS HAVING HALOGEN DOPED CORES

(71) Applicant: CORNING INCORPORATED, Corning, NY (US)

(72) Inventors: Steven Bruce Dawes, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 100 days.

(21) Appl. No.: 17/308,409

(22) Filed: May 5, 2021

(65) Prior Publication Data

US 2021/0347676 A1 Nov. 11, 2021

Related U.S. Application Data

(60) Provisional application No. 63/021,982, filed on May 8, 2020.

(51) Int. Cl.
*C03B 37/027* (2006.01)
*C03B 37/025* (2006.01)
*C03B 37/029* (2006.01)

(52) U.S. Cl.
CPC ...... *C03B 37/02718* (2013.01); *C03B 37/029* (2013.01); *C03B 37/0253* (2013.01); *C03B 2201/20* (2013.01)

(58) Field of Classification Search
None
See application file for complete search history.

(56) References Cited

U.S. PATENT DOCUMENTS

| | | | |
|---|---|---|---|
| 4,396,409 A | 8/1983 | Bailey et al. |
| 5,320,658 A | 6/1994 | Ohga et al. |
| 6,565,775 B2 | 5/2003 | Dubois et al. |
| 6,576,164 B2 | 6/2003 | Guenot et al. |
| 6,851,282 B2 | 2/2005 | Nagayama et al. |
| 6,928,840 B1 | 8/2005 | Nagayama et al. |
| 6,954,572 B2 | 10/2005 | Moridaira et al. |
| 7,565,820 B2 | 7/2009 | Foster et al. |

(Continued)

OTHER PUBLICATIONS

Willsey, "Basics of Glass Annealing", Kopp Glass—http://www.koppglass.com:80/blog/basics-glass-annealing/, per Wayback Machine published May 27, 2017, 5 pages. (Year: 2017).*

(Continued)

*Primary Examiner* — Lisa L Herring
(74) *Attorney, Agent, or Firm* — Kevin L. Bray

(57) ABSTRACT

A method of processing an optical fiber includes drawing the optical fiber from an optical fiber preform within a draw furnace, the optical fiber extending from the draw furnace along a process pathway, the optical fiber comprising at least one halogen-doped core; and drawing the optical fiber through at least one slow cooling device positioned downstream from the draw furnace at a draw speed. The at least one slow cooling device exposes the optical fiber to a slow cooling device process temperature greater than or equal to 800° C. and less than or equal to 1600° C. The draw speed is such that the optical fiber has a residence time of at least 0.1 s in the at least one slow cooling device. An optical fiber made by such a process is also disclosed.

12 Claims, 5 Drawing Sheets

(56) References Cited

U.S. PATENT DOCUMENTS

| | | |
|---|---|---|
| 7,677,060 B2 | 3/2010 | Oku et al. |
| 7,737,971 B2 | 6/2010 | Kitagawa |
| 8,074,474 B2 | 12/2011 | Filippov et al. |
| 8,528,368 B2 | 9/2013 | Faler et al. |
| 9,309,143 B2 | 4/2016 | Dunwoody et al. |
| 9,594,212 B2 | 3/2017 | Bookbinder et al. |
| 9,618,692 B2 | 4/2017 | Berkey et al. |
| 9,932,260 B2 | 4/2018 | Billings et al. |
| 10,221,089 B2 | 3/2019 | Bookbinder et al. |
| 10,322,963 B2 | 6/2019 | Bookbinder et al. |
| 10,465,585 B2 | 11/2019 | Bookbinder et al. |
| 10,479,720 B2 | 11/2019 | Dunwoody et al. |
| 2002/0044753 A1 | 4/2002 | Nagayama et al. |
| 2004/0031291 A1 | 2/2004 | Hamada et al. |
| 2009/0139270 A1 | 6/2009 | Filippov et al. |
| 2011/0239709 A1 | 10/2011 | Okada |
| 2011/0274404 A1 | 11/2011 | Okada |
| 2012/0014654 A1 | 1/2012 | Haruna et al. |
| 2015/0040614 A1 | 2/2015 | Dunwoody et al. |
| 2015/0251945 A1 | 9/2015 | Nakanishi et al. |
| 2016/0299289 A1* | 10/2016 | Bookbinder .............. C03C 3/06 |
| 2016/0304392 A1* | 10/2016 | Bookbinder .......... C03C 13/045 |
| 2017/0003445 A1* | 1/2017 | Bookbinder .......... C03C 13/046 |
| 2017/0176673 A1* | 6/2017 | Berkey ................ G02B 6/0281 |
| 2017/0297947 A1 | 10/2017 | Billings et al. |
| 2018/0093915 A1 | 4/2018 | Dunwoody et al. |
| 2018/0186682 A1 | 7/2018 | Kitamura |
| 2021/0294027 A1* | 9/2021 | Bennett .............. G02B 6/02014 |
| 2021/0294029 A1* | 9/2021 | Bickham ............ G02B 6/02395 |

OTHER PUBLICATIONS

"Industrial glass (glass)" Encyclopedia Britannica. Encyclopedia Britannica Online, Encyclopedia Britannica Inc., 2014. Retrieved—Web. Sep. 9, 2014) (Year: 2014).*

Galeener et al., "Raman Studies of Vitreous SiO2 Versus Fictive Temperature", In Physical Review B, vol. 28 Issue 6, 1983, pp. 3266-3271.

Peng et al., "Radial Distribution of Fictive Temperature in Silica Optical Fiber", Journal of Non-Crystalline Solids, vol. 217, 1997, pp. 272-277.

U.S. Appl. No. 62/976,545, filed Feb. 14, 2020.

International Search Report and Written Opinion of the International Searching Authority; PCT/US2021/028810; dated Nov. 17, 2021; 18 pages; European Patent Office.

Invitation to Pay Additional Fees of the International Searching Authority; PCT/US2021/028810; mailed on Jul. 15, 2021, 11 pages; European Patent Office.

* cited by examiner

SLOW COOLING OF OPTICAL FIBERS HAVING HALOGEN DOPED CORES

This application claims priority under 35 USC § 119(e) from U.S. Provisional Patent Application Ser. No. 63/021,982 filed on May 8, 2020 which is incorporated by reference herein in its entirety.

FIELD

This disclosure pertains to methods of making optical fibers. More particularly, this disclosure relates to methods of making optical fibers comprising at least one halogen-doped core, in which the methods employ controlled cooling protocols.

TECHNICAL BACKGROUND

In the manufacturing of optical fibers, optical preforms are heated to temperatures greater than the glass softening point and then drawn at large draw down ratios to form optical fibers having a diameter smaller than that of the preform. The optical fibers include a glass-based core portion and a glass-based cladding portion surrounding the core portion. Due to the high draw temperatures, large draw down ratios and fast draw speeds, the glass may be far from an equilibrium state, potentially resulting in optical fibers with high fictive temperature. High fictive temperatures are undesirable because high fictive temperatures are known to correlate with increased attenuation of optical signals in optical fibers. Attenuation is the reduction in intensity of the light beam (or signal) with respect to distance travelled through a transmission medium, and it significantly impacts the usefulness of optical fibers. To reduce attenuation in optical fibers, it is desirable to modify processing conditions to produce optical fibers with lower fictive temperature. Further, halogen-doping of the core region of silica-based optical fibers has been used for lowering attenuation, but the halogen-doped fibers may still exhibit unsatisfactory attenuation, particularly when the halogen-doped fibers have high fictive temperatures.

Modified processing conditions to reduce fictive temperatures have emphasized slow cooling to stabilize the optical fiber in a state closer to an equilibrium state. Prolonged cooling of an optical fiber at temperatures in the glass transition range of the fiber is one strategy for reducing fictive temperature. The extent to which fictive temperature can be reduced in existing fiber processing systems at the draw speeds used in optical fiber manufacturing, however, is limited because the residence time of the optical fiber at temperatures within the glass transition range is too short (typically <0.2 sec) to permit significant relaxation of the structure of the glass. Because of the short residence time, the structure of the glass remains far from the equilibrium state and the attenuation of the optical fiber remains too high for many applications.

SUMMARY

Thus, a method of processing halogen-doped optical fibers having low fictive temperatures and satisfactory attenuation is needed.

In a first aspect, either alone or in combination with any other aspect, a method of processing an optical fiber includes drawing the optical fiber from an optical fiber preform within a draw furnace, wherein the optical fiber extends from the draw furnace along a process pathway, and wherein the optical fiber comprises at least one halogen-doped core comprising a halogen concentration greater than or equal to 0.5 wt %; and drawing the optical fiber through at least one slow cooling device positioned downstream from the draw furnace at a draw speed. The at least one slow cooling device exposes the optical fiber to a slow cooling device process temperature greater than or equal to 800° C. and less than or equal to 1600° C. The draw speed is such that the optical fiber has a residence time of at least 0.1 s in the at least one slow cooling device.

In a second aspect, alone or in combination with any other aspect, the at least one halogen-doped core comprises greater than or equal to 1.0 wt. % and less than or equal to 6.5 wt. % chlorine.

In a third aspect, alone or in combination with any other aspect, the at least one halogen-doped core comprises greater than or equal to 0.5 wt. % and less than or equal to 4.0 wt. % bromine.

In a fourth aspect, alone or in combination with any other aspect, the at least one halogen-doped core comprises at least two halogens.

In a fifth aspect, alone or in combination with any other aspect, the slow cooling device process temperature is greater than or equal to 900° C. and less than or equal to 1250° C.

In a sixth aspect, alone or in combination with any other aspect, the optical fiber has a residence time of at least 0.15 s in the at least one slow cooling device.

In a seventh aspect, alone or in combination with any other aspect, the optical fiber has a residence time of at least 0.2 s in the at least one slow cooling device.

In an eighth aspect, alone or in combination with any other aspect, the optical fiber has a residence time of at least 1.0 s in the at least one slow cooling device.

In a ninth aspect, alone or in combination with any other aspect, the at least one slow cooling device exposes the optical fiber to a slow cooling device process temperature greater than or equal to 800° C. and less than or equal to 1500° C., and the draw speed is such that the optical fiber has a residence time of at least 0.15 s in the at least one slow cooling device.

In a tenth aspect, alone or in combination with any other aspect, the at least one slow cooling device exposes the optical fiber to a slow cooling device process temperature greater than or equal to 800° C. and less than or equal to 1500° C., and the draw speed is such that the optical fiber has a residence time of at least 0.2 s in the at least one slow cooling device.

In an eleventh aspect, alone or in combination with any other aspect, the at least one slow cooling device exposes the optical fiber to a slow cooling device process temperature greater than or equal to 800° C. and less than or equal to 1500° C., and the draw speed is such that the optical fiber has a residence time of at least 0.5 s in the at least one slow cooling device.

In a twelfth aspect, alone or in combination with any other aspect, the draw speed is greater than or equal to 30 m/s.

In a thirteenth aspect, alone or in combination with any other aspect, the draw speed is greater than or equal to 40 m/s.

In a fourteenth aspect, alone or in combination with any other aspect, the draw speed is greater than or equal to 50 m/s.

In a fifteenth aspect, alone or in combination with any other aspect, the draw speed is greater than or equal to 60 m/s.

In a sixteenth aspect, alone or in combination with any other aspect, the at least one slow cooling device comprises at least two slow cooling devices arranged such that the optical fiber passes from one of the at least two slow cooling devices to another of the at least two slow cooling devices.

In a seventeenth aspect, alone or in combination with any other aspect, the optical fiber is drawn through the at least one slow cooling device at least two times.

In an eighteenth aspect, alone or in combination with any other aspect, the optical fiber is redirected through the at least one slow cooling device at least two times via at least two fluid bearing devices operatively coupled to and downstream from the draw furnace, wherein each of the at least two fluid bearing devices comprise a body having a plurality of support channels.

In a nineteenth aspect, alone or in combination with any other aspect, the optical fiber after the drawing through at least one slow cooling device has a fictive temperature of greater than or equal to 1300° C. and less than or equal to 1485° C.

In a twentieth aspect, alone or in combination with any other aspect, the optical fiber has an attenuation of ≤0.18 dB/km at a wavelength of 1550 nm.

In a twenty-first aspect, alone or in combination with any other aspect, an optical fiber may be made by a method that includes drawing the optical fiber from an optical fiber preform within a draw furnace, wherein the optical fiber extends from the draw furnace along a process pathway, and wherein the optical fiber comprises at least one halogen-doped core comprising a halogen concentration greater than or equal to 0.5 wt %; and drawing the optical fiber through at least one slow cooling device positioned downstream from the draw furnace at a draw speed. The at least one slow cooling device exposes the optical fiber to a slow cooling device process temperature greater than or equal to 800° C. and less than or equal to 1600° C. The draw speed is such that the optical fiber has a residence time of at least 0.1 s in the at least one slow cooling device. The optical fiber after the drawing through at least one slow cooling device has a fictive temperature of greater than or equal to 1300° C. and less than or equal to 1485° C.

In a twenty-second aspect, alone or in combination with any other aspect, a method of processing an optical fiber includes determining, for an optical fiber preform comprising at least one halogen-doped core comprising a concentration of at least one halogen, an annealing temperature based on the halogen concentration of the at least one halogen-doped core; determining, based on the annealing temperature, a fiber entrance temperature and a fiber exit temperature; heating in a draw furnace the optical fiber preform to a temperature above a softening point of the optical fiber preform; drawing the optical fiber from the optical fiber preform along a draw pathway; and cooling the optical fiber in a treatment region disposed along the draw pathway at a draw speed, the optical fiber entering the treatment region at the fiber entrance temperature and exiting the treatment region at the fiber exit temperature, wherein the annealing temperature is between the fiber entrance temperature and the fiber exit temperature.

In a twenty-third aspect, alone or in combination with any other aspect, the optical fiber has a residence time in the treatment region of at least 0.4 s.

In a twenty-fourth aspect, alone or in combination with any other aspect, the optical fiber has a residence time in the treatment region of at least 0.8 s.

In a twenty-fifth aspect, alone or in combination with any other aspect, the treatment region exposes the optical fiber to a temperature greater than or equal to 800° C. and less than or equal to 1500° C., and the draw speed is such that the optical fiber has a residence time of at least 0.4 s at the temperature in the treatment region.

In a twenty-sixth aspect, alone or in combination with any other aspect, the treatment region exposes the optical fiber to a temperature greater than or equal to 800° C. and less than or equal to 1500° C., and the draw speed is such that the optical fiber has a residence time of at least 0.8 s at the temperature in the treatment region.

In a twenty-seventh aspect, alone or in combination with any other aspect, the treatment region exposes the optical fiber to a temperature greater than or equal to 800° C. and less than or equal to 1500° C., and the draw speed is such that the optical fiber has a residence time of at least 1.0 s at the temperature in the treatment region.

In a twenty-eighth aspect, alone or in combination with any other aspect, the draw speed is greater than or equal to 30 m/s.

In a twenty-ninth aspect, alone or in combination with any other aspect, the draw speed is greater than or equal to 40 m/s.

In a thirtieth aspect, alone or in combination with any other aspect, the draw speed is greater than or equal to 50 m/s.

In a thirty-first aspect, alone or in combination with any other aspect, the draw speed is greater than or equal to 60 m/s.

In a thirty-second aspect, alone or in combination with any other aspect, the treatment region comprises at least two slow cooling devices arranged such that the optical fiber passes from one of the at least two slow cooling devices to another of the at least two slow cooling devices.

In a thirty-third aspect, alone or in combination with any other aspect, the treatment region comprises at least one slow cooling device and the optical fiber is drawn through the at least one slow cooling device at least two times.

In a thirty-fourth aspect, alone or in combination with any other aspect, the optical fiber is redirected through the at least one slow cooling device at least two times via at least two fluid bearing devices operatively coupled to and downstream from the draw furnace, wherein each of the at least two fluid bearing devices comprise a body having a plurality of support channels.

In a thirty-fifth aspect, alone or in combination with any other aspect, the optical fiber after the cooling the optical fiber in the treatment region has a fictive temperature of greater than or equal to 1300° C. and less than or equal to 1485° C.

In a thirty-sixth aspect, alone or in combination with any other aspect, the optical fiber has an attenuation of ≤0.18 dB/km at a wavelength of 1550 nm.

It is to be understood that both the foregoing general description and the following detailed description are merely exemplary, and are intended to provide an overview or framework to understand the nature and character of the claims. Additional features and advantages will be set forth in the detailed description which follows, and in part will be readily apparent to those skilled in the art from the description or recognized by practicing the embodiments as described in the written description and claims hereof, as well as the appended drawings.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1:
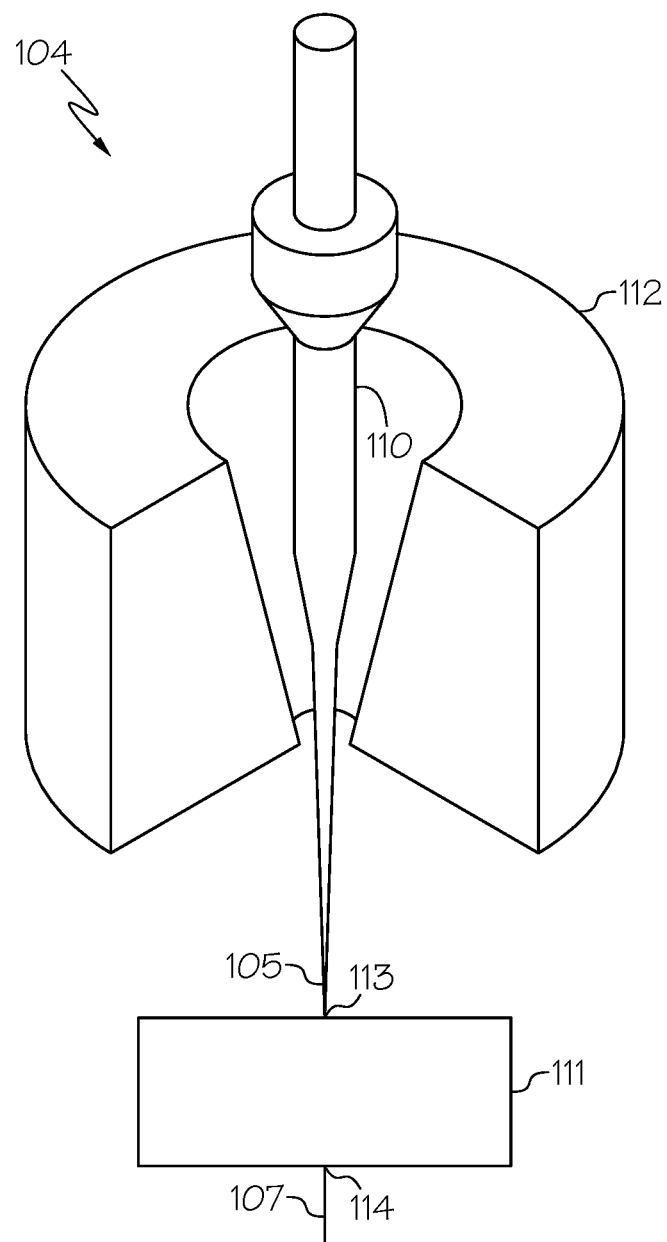
FIG. 1 schematically depicts an optical fiber production system with a glass heating source and a cooling stage.

Reference will now be made in detail to methods of forming optical fibers with halogen doped cores and optical fibers formed from such methods. Whenever possible, the same reference numerals will be used throughout the drawings to refer to the same or like parts. According to embodiments, a method of processing an optical fiber includes drawing the optical fiber from an optical fiber preform within a draw furnace. The optical fiber may extend from the draw furnace along a process pathway and may include at least one halogen-doped core comprising a concentration of at least one halogen. The method further includes drawing the optical fiber through at least one slow cooling device positioned downstream from the draw furnace at a draw speed. The at least one slow cooling device exposes the optical fiber to a slow cooling device process temperature greater than or equal to 800° C. and less than or equal to 1600° C., and the draw speed is such that the optical fiber has a residence time of at least 0.1 s in the at least one slow cooling device.

According to embodiments, a method of processing an optical fiber includes determining, for an optical fiber preform comprising at least one halogen-doped core comprising a concentration of at least one halogen, an annealing temperature based on the concentration of the at least one halogen in the at least one halogen-doped core; determining, based on the annealing temperature, a fiber entrance temperature and a fiber exit temperature; heating in a draw furnace the optical fiber preform to a temperature above a softening point of the optical fiber preform; drawing the optical fiber from the optical fiber preform along a draw pathway; and cooling the optical fiber in a treatment region disposed along the draw pathway, the optical fiber entering the treatment region at the fiber entrance temperature and exiting the treatment region at the fiber exit temperature, wherein the annealing temperature is between the fiber entrance temperature and the fiber exit temperature. Various methods of forming optical fibers and optical fibers formed therefrom will be further described in detail herein with specific reference to the appended drawings.

In this specification and in the claims which follow, reference will be made to a number of terms which shall be defined to have the following meanings:

As used herein, the term "glass viscosity" refers to a quantity expressing the magnitude of resistance to flow in a glass composition, as measured by the force per unit area resisting a flow in which parallel layers unit distance apart have unit speed relative to one another. The glass viscosity was measured according to the beam bending method which measures the glass viscosity between the softening point and the annealing range (approximately from $10^8$ Pascal·seconds (Pa·s) to $10^{13}$ Pa·s), as prescribed by ASTM method outlined in C1350M.

As used herein, the term "softening point" of a glass composition refers to the temperature at which the viscosity of the glass composition is about $10^{7.6}$ Poise (P). The softening point was measured according to the parallel plate viscosity method which measures the viscosity of inorganic glass from $10^7$ to $10^9$ poise as a function of temperature, similar to the ASTM C1351M.

As used herein, the term "anneal point" or "annealing temperature" of a glass composition refers to the temperature at which the viscosity of the glass composition is about $10^{13.2}$ Poise (P). The annealing temperature was measured according to the beam bending viscosity method which measures the viscosity of inorganic glass from $10^{12}$ to $10^{14}$ poise as a function of temperature in accordance with ASTM C598.

Attenuation was measured according to the FOTP-61, "Measurement of Fiber or Cable Attenuation Using an OTDR," and FOTP-78 IEC 60793-1-40, "Optical Fibres—Part 1-40: Measurement Methods and Test Procedures," the entire content of both of which is incorporated by reference herein.

Fiber temperature refers to the average temperature of the optical fiber, which may be measured using a noncontact infrared temperature measurement instrument, such as a dual wavelength pyrometer.

Fictive temperature refers to the average fictive temperature of the core and cladding regions of a glass optical fiber. Fictive temperature was measured using one of Fourier Transform Infrared spectroscopy, Raman spectroscopy, and/or acoustic spectroscopy. Fictive temperature is determined after cooling the fiber in the methods described herein. For purposes of the present disclosure, the fictive temperature of a fiber ($T_{f,fiber}$) is given by the relation:

$$T_{f,fiber} = \frac{\int_r^R P(r)T_f(r)rdr}{\int_r^R P(r)rdr}$$

where P(r) is the radial power distribution within the fiber and $T_f(r)$ is the radial fictive temperature distribution function in the fiber that can be determined using methods known in the art [see, e.g., Y. Peng, A. Agarwal, M. Tomozawa and T. A. Blanchet, "Radial Distribution of Fictive Temperatures in Silica Optical Fibers", Journal of Non-Crystalline Solids, 217 (2-3), 217, 272-277 (1997), the entire contents of which are incorporated by reference herein].

Ambient temperature refers to a temperature outside the controlled conditions of the treatment region. Environmental temperature refers to a temperature inside the treatment region.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The optical fibers disclosed herein include a core region, a cladding region immediately adjacent to and surrounding the core region, and a coating immediately adjacent to and surrounding the cladding region. The core region and cladding region are glass and define a glass fiber. The core region has a higher refractive index than the cladding region. The cladding region is a single homogeneous region or multiple regions, at least two of which differ in relative refractive index. The multiple cladding regions are preferably concentric regions.

In some embodiments, the cladding region includes an inner cladding region and an outer cladding region directly adjacent to and surrounding the inner cladding region. The relative refractive index of the inner cladding region may be greater than, equal to, or less than the relative refractive index of the outer cladding region. In embodiments without a depressed index cladding region, an inner cladding region having a lower refractive index than the outer cladding region is referred to herein as a trench or trench region.

In some embodiments, the cladding region includes a depressed index cladding region between and directly adjacent to an inner cladding region and an outer cladding region. The depressed index cladding region is a cladding region having a lower relative refractive index than the inner cladding and the outer cladding region. The depressed index cladding region surrounds and is directly adjacent to an inner cladding region. The depressed index cladding region is surrounded by and directly adjacent to an outer cladding region. The depressed index cladding region may contribute to a reduction in bending losses.

As will be described further hereinbelow, the relative refractive indices of the core region, inner cladding region, depressed index cladding region, and outer cladding region may differ. Each of the regions may be formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is silica glass. When the undoped glass is silica glass, updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different portions of the region. Refractive index varies approximately linearly with the concentration of the updopant or downdopant. For example, each 1 wt % Cl as a dopant in silica glass increases the relative refractive index by about 0.083 Δ% and each 1 wt % F as a dopant in silica glass decreases the relative refractive index by about 0.32 Δ%.

The present description provides methods of processing optical fibers with halogen-doped cores having low attenuation and low fictive temperature and such optical fibers. The optical fibers exhibit attenuation of optical signals less than 0.18 dB/km at a wavelength of 1550 nm. The optical fibers are prepared by a process that includes controlled cooling of the optical fiber. The controlled cooling permits production of optical fibers with fictive temperatures less than 1485° C. The attenuation and fictive temperatures of the optical fibers are achieved in fiber draw processes operated at draw speeds greater than or equal to 30 m/s and less than or equal to 80 m/s.

In various embodiments, the core portion of the optical fibers is doped with halogen. The halogen may be chlorine, or bromine, or a mixture of chlorine and bromine. In various embodiments, the halogen concentration in the core may be greater than or equal to 0.5 mole % ("mol. %"), greater than or equal to 1.0 mol. %, greater than or equal to 1.5 mol. %, may be greater than or equal to 2.0 mol. %, greater than or equal to 3.0 mol. %, greater than or equal to 4.0 mol. %, greater than or equal to 5.0 mol. %, greater than or equal to 6.0 mol. %, greater than or equal to 7.0 mol. %, greater than or equal to 8.0 mol. %, or even greater than or equal to 9.0 mol. %. In various embodiments, the halogen concentration in the core may be greater than or equal to 4.0 mol. % to 10 mol. %, greater than or equal to 5.0 mol. % to 9.0 mol. %, greater than or equal to 6.0 mol. % to 8.0 mol. %, or even greater than or equal to 6.5 mol. % to 7.5 mol. %. It should be understood that the halogen concentration of the core of the optical fiber may be within a range formed from any one of the lower bounds for the concentration and any one of the upper bounds for the concentration described herein.

In various embodiments, the core portion of the optical fibers is doped with halogen. The halogen may be chlorine, or bromine, or a mixture of chlorine and bromine. In various embodiments, the halogen concentration in the core may be greater than or equal to 0.5 weight % ("wt. %"), greater than or equal to 1.0 wt. %, greater than or equal to 1.5 wt. %, may be greater than or equal to 2.0 wt. %, greater than or equal to 3.0 wt. %, greater than or equal to 0.5 wt. %, greater than or equal to 1.0 wt. %, greater than or equal to 1.5 wt. %, greater than or equal to 0.5 wt. % and less than or equal to 6.5 wt. %, greater than or equal to 1.0 wt. % and less than or equal to 6.5 wt. %, greater than or equal to 1.5 wt. % and less than or equal to 6.0 wt. %, greater than or equal to 2.0 wt. % and less than or equal to 5.5 wt. %, greater than or equal to 2.5 wt. % and less than or equal to 5.0 wt. %, greater than or equal to 3.0 wt. % and less than or equal to 4.5 wt. %, or even greater than or equal to 3.5 wt. % and less than or equal to 4.0 wt. %, greater than or equal to 0.3 wt. %, greater than or equal to 0.5 wt. %, greater than or equal to 0.3 wt. % and less than or equal to 4.0 wt. %, greater than or equal to 0.5 wt. % and less than or equal to 4.0 wt. %, greater than or equal to 0.5 wt. % and less than or equal to 3.5 wt. %, greater than or equal to 1.0 wt. % and less than or equal to 3.0 wt. %, or even greater than or equal to 1.5 wt. % and less than or equal to 2.5 wt. %.

In various embodiments, the chlorine concentration in the core may be greater than or equal to 0.25 wt. %, greater than or equal to 0.5 wt. %, greater than or equal to 1.0 wt. %, greater than or equal to 1.5 wt. %, greater than or equal to 0.5 wt. % and less than or equal to 6.5 wt. %, greater than or equal to 1.0 wt. % and less than or equal to 6.5 wt. %, greater than or equal to 1.5 wt. % and less than or equal to 6.0 wt. %, greater than or equal to 2.0 wt. % and less than or equal to 5.5 wt. %, greater than or equal to 2.5 wt. % and less than or equal to 5.0 wt. %, greater than or equal to 3.0 wt. % and less than or equal to 4.5 wt. %, or even greater than or equal to 3.5 wt. % and less than or equal to 4.0 wt. %. It should be understood that the chlorine concentration of the core of the optical fiber may be within a range formed from any one of the lower bounds for the concentration and any one of the upper bounds for the concentration described herein.

In various embodiments, the bromine concentration in the core may be greater than or equal to 0.2 wt. %, greater than or equal to 0.3 wt. %, greater than or equal to 0.5 wt. %, greater than or equal to 0.2 wt. % and less than or equal to 4.5 wt. %, greater than or equal to 0.3 wt. % and less than or equal to 4.0 wt. %, greater than or equal to 0.5 wt. % and less than or equal to 4.0 wt. %, greater than or equal to 0.5 wt. % and less than or equal to 3.5 wt. %, greater than or equal to 1.0 wt. % and less than or equal to 3.0 wt. %, or even greater than or equal to 1.5 wt. % and less than or equal to 2.5 wt. %. It should be understood that the bromine concentration of the core of the optical fiber may be within a range formed from any one of the lower bounds for the concentration and any one of the upper bounds for the concentration described herein.

In various embodiments, the attenuation of the optical fiber at a wavelength of 1550 nm is less than or equal to 0.18 dB/km, less than 0.175 dB/km, less than 0.17 dB/km, or even less than 0.165 dB/km. In various embodiments, the attenuation of the optical fiber at a wavelength of 1550 nm is in the range greater than or equal to 0.16 dB/km and less than or equal to 0.18 dB/km, in the range greater than or equal to 0.165 dB/km and less than or equal to 0.175 dB/km, in the range greater than or equal to 0.16 dB/km and less than or equal to 0.175 dB/km, or even in the range greater than or equal to 0.165 dB/km and less than or equal to 0.18 dB/km.

In various embodiments, after cooling, the fictive temperature of the optical fiber is less than or equal to 1485° C., less than 1475° C., less than 1465° C., less than 1455° C., less than 1445° C., less than 1435° C., less than 1425° C., less than 1415° C., less than 1405° C., less than 1395° C., less than 1385° C., less than 1375° C., less than 1365° C., less than 1355° C., less than 1345° C., less than 1335° C., less than 1325° C., or even less than 1315° C. In various embodiments, the fictive temperature of the optical fiber is in the range greater than or equal to 1300° C. and less than or equal to 1485° C., in the range greater than or equal to 1305° C. and less than or equal to 1480° C., in the range greater than or equal to 1310° C. and less than or equal to 1475° C., in the range greater than or equal to 1315° C. and less than or equal to 1470° C., in the range greater than or equal to 1320° C. and less than or equal to 1465° C., in the range greater than or equal to 1325° C. and less than or equal to 1460° C., in the range greater than or equal to 1330° C. and less than or equal to 1455° C., in the range greater than or equal to 1335° C. and less than or equal to 1450° C., in the range greater than or equal to 1340° C. and less than or equal to 1445° C., in the range greater than or equal to 1345° C. and less than or equal to 1440° C., in the range greater than or equal to 1350° C. and less than or equal to 1435° C., in the range greater than or equal to 1355° C. and less than or equal to 1430° C., in the range greater than or equal to 1360° C. and less than or equal to 1425° C., in the range greater than or equal to 1365° C. and less than or equal to 1420° C., in the range greater than or equal to 1370° C. and less than or equal to 1415° C., in the range greater than or equal to 1375° C. and less than or equal to 1410° C., in the range greater than or equal to 1380° C. and less than or equal to 1405° C., in the range greater than or equal to 1385° C. and less than or equal to 1400° C., or even in the range greater than or equal to 1390° C. and less than or equal to 1395° C. It should be understood that the fictive temperature of the optical fiber may be within a range formed from any one of the lower bounds for the fictive temperature and any one of the upper bounds for the fictive temperature described herein.

Embodiments further extend to optical fibers exhibiting both the attenuation at 1550 nm and the fictive temperature after cooling described above. In other embodiments, however, the optical fibers may exhibit either the described attenuation or the described fictive temperature.

Optical fibers in accordance with the embodiments disclosed herein are produced in fiber draw processes operated at draw speeds greater than or equal to 30 m/s, greater than 35 m/s, greater than 40 m/s, greater than 45 m/s, greater than 50 m/s, greater than 55 m/s, greater than 60 m/s, greater than 65 m/s, greater than 70 m/s, greater than 75 m/s, or even at 80 m/s. In various embodiments, the fiber draw process is operated at draw speeds in the range greater than or equal to 30 m/s and less than or equal to 80 m/s, in the range greater than or equal to 35 m/s and less than or equal to 75 m/s, in the range greater than or equal to 40 m/s and less than or equal to 70 m/s, in the range greater than or equal to 45 m/s and less than or equal to 65 m/s, or even in the range greater than or equal to 50 m/s and less than or equal to 60 m/s. It should be understood that the fiber draw process may be operated at draw speeds within a range formed from any one of the lower bounds for the draw speed and any one of the upper bounds for the draw speed described herein.

In a fiber draw process, optical fibers are formed by drawing an optical fiber from a glass preform. The glass preform is heated to a softened state and an optical fiber is drawn from the softened preform through the action of gravity and applied tension. As the fiber is drawn from the preform, it cools and, as it cools, the structure of the glass changes from a relatively disordered state in the preform to a more ordered state in the cooled fiber. Without intending to be bound by any particular theory, the driving force for ordering of the glass structure during cooling is believed to be the lowering of energy in the glass to a state of thermodynamic equilibrium. Thermodynamic equilibrium corresponds to the minimum energy state of the glass. As a glass cools, however, its viscosity increases and the structural rearrangements needed for structural relaxation are inhibited. As a result, the time scale needed to reach the equilibrium state is increased.

The extent to which the structure of the glass relaxes over a given time period during cooling depends on the rate of cooling. At fast cooling rates, the viscosity of the glass increases rapidly and the window of time in which the viscosity is sufficiently low to permit structural rearrangement is short. As a result, the extent of the relaxation of the glass structure is limited, the approach to equilibrium is kinetically inhibited, and the glass remains in a non-equilibrium state. As the cooling rate decreases, the time window in which the glass exhibits a viscosity in the range conducive to structural relaxation is increased allowing the glass to approach an equilibrium structural state during cooling.

Fictive temperature is an indicator of structure in glasses. As the structure of a glass relaxes and approaches an equilibrium state, the fictive temperature of the glass decreases. For a given composition, glasses with a high fictive temperature are further removed from equilibrium and have less relaxed structures than glasses with a relatively lower fictive temperature. Relaxation of glass structure is accompanied by a reduction in fictive temperature.

Processing conditions that lower the fictive temperature of optical fibers are desirable because optical fibers with low fictive temperatures exhibit low attenuation. The fictive temperature of an optical fiber may be influenced by controlling the cooling rate of the fiber during manufacture. Processing stages used to control the cooling rate of an optical fiber are referred to herein as "treatment" or "slow cooling" devices or regions. A slow cooling device includes a controlled cooling region that establishes an environmental temperature to which the optical fiber is exposed during cooling. During the draw process, an optical fiber passes through the controlled cooling region and the temperature of the fiber is influenced by the thermal conditions (including environmental temperature) maintained in the controlled cooling region.

The rate of cooling in a slow cooling device can be influenced by controlling the difference between the fiber temperature and the environmental temperature of the controlled cooling region. The closer the environmental temperature is to the fiber temperature, the slower the cooling rate. In various embodiments, a heated gas may be supplied to the controlled cooling region and the optical fiber may be exposed to the heated gas as it passes through the controlled cooling region during processing. The gas environment surrounding the optical fiber is referred to herein as the environment. The temperature of the heated gas corresponds to the environmental temperature, where the environmental temperature is less than the temperature of the fiber, but greater than room temperature. As a result, the rate of cooling of the fiber in the presence of the heated gas is slower than the rate of cooling of the fiber in the presence of room temperature air.

The time of exposure of the fiber to the controlled cooling region, referred to herein as "residence time," may also affect the control of the fictive temperature of the fiber. Relaxation of the structure of a glass occurs on a time scale characteristic of the atomic rearrangements that occur as the glass approaches an equilibrium state. For a given glass composition, the time scale for structural relaxation varies with the viscosity of the glass. When the glass has low viscosity, atomic rearrangements are more facile and the characteristic time scale of glass relaxation is shorter. In order for the structure of the glass to relax effectively, the viscosity of the glass should be sufficiently low for a sufficiently long period of time to enable structural rearrangement. Since glass viscosity varies with glass temperature, reductions in fictive temperature require processes in which the residence time of the fiber in a controlled cooling region maintained at a particular environmental temperature is sufficiently long to permit structural relaxation. To achieve the greatest reduction in fictive temperature at the particular environmental temperature of the controlled cooling region, the residence time of the fiber in the controlled cooling region should be sufficiently long to relax the structure of the glass to the extent possible at the particular environmental temperature of the controlled cooling region. Further reductions in fictive temperature can be realized by lowering the fiber temperature by systematically lowering the environmental temperature of the controlled cooling region (or passing the fiber through a series of controlled cooling regions with progressively decreasing environmental temperatures) and insuring that the residence time of the fiber in the controlled cooling region(s) is sufficiently long at each environmental temperature to permit structural relaxation to the greatest extent possible.

As the fiber temperature decreases, however, the time scale needed to effect structural relaxation to a degree capable of meaningfully reducing fictive temperature increases. At some point during cooling, a fiber temperature is reached at which the necessary time scale becomes unreasonably long for manufacturing. At this point, cooling rate is no longer a practical consideration and it is desirable to decrease the fiber temperature to room temperature at high cooling rates to improve process speed.

Continuous manufacturing processes, in which a fiber is drawn continuously at a particular draw speed, are preferred for reasons of cost and efficiency. Continuous manufacturing processes, however, present additional challenges for lowering fictive temperature because the optical fiber is in constant motion. Due to the constant motion, the fiber has a residence time in the controlled cooling region dictated by the draw speed. Increased residence time can be achieved by drawing fibers at lower speeds, but low draw speeds are not desirable from the perspective of process efficiency. At a particular draw speed, the length of the controlled cooling region may also influence residence time. Due to space constraints in practical manufacturing facilities, however, the length of the controlled cooling region is necessarily limited.

Space constraints introduce further complications because systems used to process optical fibers include process units in addition to slow cooling devices. In a typical fiber manufacture process, the fiber is drawn from a preform situated in a draw furnace and routed on a process pathway that includes thermal treatment devices (e.g. slow cooling devices), coating devices (e.g. devices that apply liquid compositions for forming primary coatings, secondary coatings, and ink layers), metrology units (e.g. fiber diameter control), and various fiber handling devices (e.g. turning devices, take up spools). In order to reduce the space needed to manufacture optical fibers, it is desirable to position the process units as close as possible to each other. Close positioning of process units is complicated because individual operation of the different process units requires the fiber temperature to be within a particular range. In order to coat a fiber, for example, the fiber temperature needs to be sufficiently low to prevent vaporization of volatile components of liquid coating formulations applied to the surface of the fiber. Fiber handling devices require fiber temperatures that are sufficiently low to preserve the mechanical integrity of the fiber. If the fiber temperature is too high, bending or winding of a fiber can introduce permanent structural deformations that damage or compromise the integrity of the fiber. As a result, considerations related to fiber cooling extend beyond the temperature window associated with control of fictive temperature to include the lower temperatures needed for coating and handling of the fiber.

The competing demands on the evolution of fiber temperature during the fiber draw process necessitate compromises in the cooling rate of the fiber. On the one hand, slow cooling rates are preferred to further the objective of lowering the fictive temperature of the fiber. On the other hand, fast cooling rates are desired to further the objectives of compactness of the arrangement of processing units in manufacturing and high speed processing.

In conventional fiber draw processes, the competing demands on fiber temperature are resolved by incorporating a slow cooling device with a controlled cooling region held at a constant environmental temperature in the manufacturing process and adjusting the constant environmental temperature to a level that provides cooling at a sufficient rate to insure that the fiber temperature at the exit of a slow cooling device is sufficiently low to meet the requirements of a downstream processing unit.

While the compromise in cooling rates embodied in conventional fiber draw processes leads to a reduction in fiber fictive temperature and provides optical fibers with satisfactory attenuation for many applications, by including a halogen-doped core in the presently disclosed optical fibers, the viscosity of the glass is lowered, allowing the fiber to relax to a greater extent in the glass transition region. Without intending to be bound by any particular theory, the greater relaxation is believed to lower both the fictive temperature and the attenuation. In particular, the present disclosure demonstrates that lower fiber fictive temperature and lower fiber attenuation can be obtained in processes that utilize a slow cooling device in which the temperature of the slow cooling device is correlated with the concentration of halogen in the halogen-doped core.

Systems for performing the present method are depicted schematically in FIG. 1. Production system 104 includes a glass heating source with furnace 112 and optical fiber preform 110. Preform 110 is formed with at least one halogen-doped core portion such that a fiber drawn therefrom has a halogen-doped core portion. The preform 110 is heated in furnace 112 to a temperature above its softening point and is drawn to form fiber 105 (i.e., the "formed fiber"), which is directed to treatment region 111 with a fiber entrance temperature $T_1$ (i.e., the temperature of fiber 105 as measured at the entrance 113 of treatment region 111) and is cooled at a cooling rate by circulating heated gas throughout the treatment region 111, as described above, to produce fiber 107 having a fiber exit temperature $T_2$ (i.e., the "cooled fiber" where the temperature of the fiber 107 is measured at the exit 114 of treatment region 111). The position of treatment region 111 relative to furnace 112, as well as the size or path length of treatment regions 111, or draw speed, may be adjusted to conform to the desired fiber entrance temperature $T_1$, fiber exit temperature $T_2$, residence time, and/or treatment rates. For example, the position of the treatment region 111 relative to the furnace 112 may be adjusted (such as by repositioning the treatment region 111) so that the fiber 105 cools in room temperature air to the fiber entrance temperature $T_1$ upon entering the treatment region 111.

In embodiments, fiber entrance temperature $T_1$ may be greater than or equal to 1350° C., greater than or equal to 1400° C., greater than or equal to 1450° C., greater than or equal to 1500° C., greater than or equal to 1550° C., or even greater than or equal to 1425° C. For instance, the fiber entrance temperature $T_1$ may be in the range greater than or equal to 900° C. and less than or equal to 1600° C., greater than or equal to 950° C. and less than or equal to 1550° C., greater than or equal to 1000° C. and less than or equal to 1500° C., greater than or equal to 1050° C. and less than or equal to 1450° C., greater than or equal to 1100° C. and less than or equal to 1400° C., greater than or equal to 1150° C. and less than or equal to 1350° C., or even greater than or equal to 1200° C. and less than or equal to 1300° C. It should be understood that the fiber entrance temperature $T_1$ may be within a range formed from any one of the lower bounds for the fiber entrance temperature $T_1$ and any one of the upper bounds for the fiber entrance temperature $T_1$ described herein, and may even be above a softening point of the optical fiber preform.

In embodiments, fiber exit temperature $T_2$ may be less than or equal to 1100° C., less than or equal to 1090° C., less than or equal to 1080° C., less than or equal to 1070° C., less than or equal to 1060° C., less than or equal to 1050° C., less than or equal to 1040° C., less than or equal to 1030° C., less than or equal to 1020° C., less than or equal to 1010° C., less than or equal to 1000° C., less than or equal to 990° C., less than or equal to 980° C., less than or equal to 970° C., less than or equal to 960° C., less than or equal to 950° C., less than or equal to 940° C., less than or equal to 930° C., less than or equal to 920° C., less than or equal to 910° C., or even less than or equal to 900° C. For instance, fiber exit temperature $T_2$ may be in the range greater than or equal to 900° C. and less than or equal to 1100° C., greater than or equal to 910° C. and less than or equal to 1090° C., greater than or equal to 920° C. and less than or equal to 1080° C., greater than or equal to 930° C. and less than or equal to 1070° C., greater than or equal to 940° C. and less than or equal to 1060° C., greater than or equal to 950° C. and less than or equal to 1050° C., greater than or equal to 960° C. and less than or equal to 1000° C., or even greater than or equal to 970° C. and less than or equal to 990° C. It should be understood that the fiber exit temperature $T_2$ may be within a range formed from any one of the lower bounds for the fiber exit temperature $T_2$ and any one of the upper bounds for the fiber exit temperature $T_2$ described herein.

The fiber entrance temperature $T_1$ and the fiber exit temperature $T_2$ may be ascertained by any conventional method. For instance, an extension muffle may be employed outside the draw furnace. Then the length of the muffle, the distance between the muffle exit and the treatment region entrance, the length of the treatment region, the ambient temperature, and the known cooling behavior of the optical fiber may all be used to calculate the fiber entrance temperature $T_1$ and the fiber exit temperature $T_2$. The method of determining the fiber entrance temperature $T_1$ and the fiber exit temperature $T_2$ described herein is meant to be instructive but not limiting.

Fiber 107 anneals in treatment region 111 between entrance temperature $T_1$ and exit temperature $T_2$, and the glass annealing temperature—i.e., the temperature at which the viscosity of the glass composition is in a range of from $10^{13}$ Poise (P) to $10^{13.5}$ P, such as about $10^{13.2}$ P, for example—depends on the halogen content of the halogen-doped core of the fiber 107. Thus, the annealing temperature of the optical fiber preform (and the fiber drawn therefrom) having at least one halogen-doped core may be initially determined based on the concentration of the at least one halogen in the at least one halogen-doped core. Once the annealing temperature is determined, the fiber entrance temperature $T_1$ and the fiber exit temperature $T_2$ can be selected based on the annealing temperature.

Figure 2:
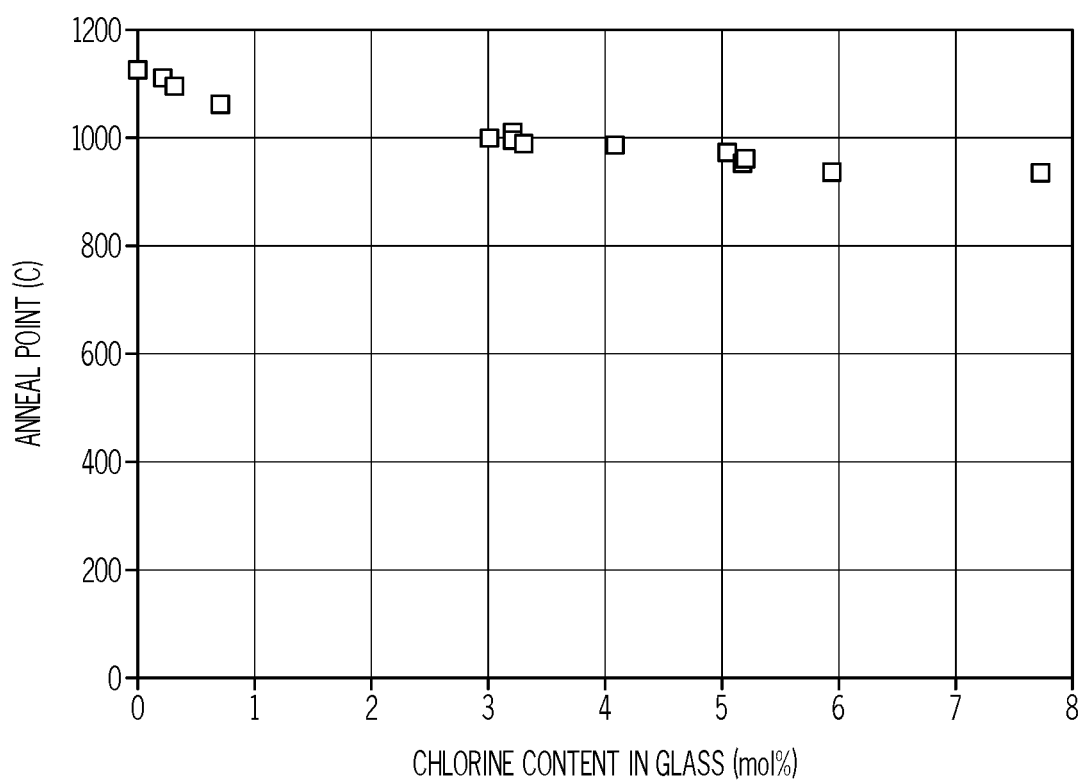
FIG. 2 graphically depicts experimental glass annealing temperature as a function of chlorine content in optical fibers in accordance with aspects described herein.

For example, FIG. 2 is a graph of the glass annealing temperature (referred to as "Anneal Point" and expressed in units of ° C.) as a function of chlorine content in optical fibers with chlorine-doped cores. From this annealing temperature data, it is possible to derive a correlation to glass viscosity as a function of chlorine concentration in mol. % and glass temperature using the Fulcher relation. Briefly, the viscosity data in the region of the anneal point as a function of chlorine concentration is fit to an exponential form. In fitting the data, it is assumed that the effect of chlorine concentration on viscosity is primarily captured in the pre-exponential parameter, and the activation energy is similar to that of pure silica glass. That is, the activation energy is assumed to be about 123.176 kcal/mol. Dividing this activation energy by the universal gas constant, R=1.987 cal·mol$^{-1}$·K$^{-1}$, provides a term, 61991 K, to include in the data fit, as shown below in Equation (1). This relationship is generalizable to halogen content.

In particular, Formula (1) below defines the relationship of the glass viscosity, the halogen concentration, and the fiber temperature:

$$\eta = e^{-14.764 - 1.967[Cl] + 0.092[Cl]^2} e^{61991/T} \tag{1}$$

where $\eta$ is the viscosity in Poise, [Cl] is the concentration of the chlorine in the glass in mol. %, and T is the fiber temperature in K. Formula (1) may be reordered to express T as a function of viscosity and halogen concentration as shown in formula (2).

$$T = \frac{61991}{\ln\eta + 14.764 + 1.967[Cl] - 0.092[Cl]^2} \tag{2}$$

When $\eta$ of formula (2) is $10^{13.2}$ Poise, T of formula (2) is the annealing temperature. To minimize the fictive temperature of the fiber 107, the cooling rate of the fiber should be kept as low as possible when cooling in the region of the annealing temperature. Temperature control may be accomplished by positioning the treatment region 111 in the appropriate location in the production system 104 to attain minimal attenuation within the constraints of the draw. For instance, an extension muffle (not shown) may be used outside of furnace 112 to control the temperature of the form fiber 105, allowing an amount of cooling prior to the optical fiber entering the treatment region 11. The length of muffle, the distance between the muffle exit and the treatment region, the length of treatment region 11, and the ambient and environmental temperatures may all be controlled to control the residence time of the fiber at a temperature range that encompasses the annealing temperature. The cooling rate indicates how quickly the fiber temperature is allowed to cool from fiber entrance temperature $T_1$ to fiber exit temperature $T_2$, i.e., the change in temperature divided by the residence time in the temperature range of $T_1$ to $T_2$. Thus, the annealing temperature should be a temperature between the fiber entrance temperature $T_1$ and the fiber exit temperature $T_2$.

The fiber may be drawn with slow cooling between fiber temperatures $T_1$ and $T_2$, with an average cooling rate during slow cooling of less than or equal to 6000° C./s and greater than or equal to 1000° C./s. In some embodiments, the fiber may be drawn with slow cooling between fiber temperatures $T_1$ and $T_2$, with an average cooling rate during slow cooling of less than or equal to 4000° C./s and greater than or equal to 1500° C./s. In some embodiments, the fiber may be drawn with slow cooling between fiber temperatures $T_1$ and $T_2$, with an average cooling rate during slow cooling of less than or equal to 3500° C./s and greater than or equal to 2000° C./s. It should be understood that the average cooling rate may be within a range formed from any one of the lower bounds for the average cooling rate and any one of the upper bounds for the average cooling rate described herein.

Table 1 shows the correlation between the fiber entrance temperature $T_1$, the fiber exit temperature $T_2$, and the halogen concentration, when chlorine is the halogen and the average cooling rate is less than 5000° C./s in accordance with formulae (1) and (2), above.

TABLE 1

| [Cl] (mol. %) | $T_1$ (° C.) | $T_2$ (° C.) | $T_{ref}$ (° C.) |
|---|---|---|---|
| 0 | 1675 | 1186 | 1948 |
| 2.5 | 1490 | 1080 | 1714 |
| 4.17 | 1414 | 1034 | 1613 |
| 5 | 1386 | 1018 | 1575 |
| 6.67 | 1351 | 996 | 1517 |
| 8.33 | 1338 | 988 | 1482 |
| 10 | 1333 | 984 | 1465 |

The residence time—the time at which any discrete point of the fiber is at a fiber temperature between the fiber entrance temperature $T_1$ and the fiber exit temperature $T_2$ in the treatment region—may also have an effect on the fictive temperature of the fiber 107. As noted above, in order for the structure of the glass to relax effectively, the viscosity of the glass should be sufficiently low for a sufficiently long period of time to enable structural rearrangement. Since glass viscosity varies with glass temperature, reductions in fictive temperature require processes in which the residence time of the fiber in a controlled cooling region maintained at a particular environmental temperature is sufficiently long to permit structural relaxation. In various embodiments, the residence time for the optical fibers disclosed herein between the fiber entrance temperature $T_1$ and the fiber exit temperature $T_2$ is greater than or equal to 0.1 s, greater than or equal to 0.15 s, greater than or equal to 0.2 s, greater than or equal to 0.3 s, greater than or equal to 0.4 s, greater than or equal to 0.5 s, greater than or equal to 0.6 s, greater than or equal to 0.7 s, greater than or equal to 0.8 s, greater than or equal to 0.9 s, or even greater than or equal to 1.0 s. For instance, the residence time for the optical fibers disclosed herein between the fiber entrance temperature $T_1$ and the fiber exit temperature $T_2$ is greater than or equal to 0.1 s and less than or equal to 2.0 s, greater than or equal to 0.125 s and less than or equal to 1.5 s, greater than or equal to 0.15 s and less than or equal to 1.5 s, or even greater than or equal to 0.15 s and less than or equal to 1.0 s. It should be understood that the residence time may be within a range formed from any one of the lower bounds for the residence time and any one of the upper bounds for the residence time described herein.

During the drawing of the fiber, the optical fiber has a stretched residence time t' that is a function of fiber entrance temperature $T_1$ according to formula (3):

$$t' = \int_{t_1}^{t_2} \frac{\eta(T_{ref})}{\eta(T)} dt \tag{3}$$

where $T_{ref}$ is the temperature at which the glass viscosity is $\eta_{ref}$ and $\eta_{ref}$ is 2.56×10⁷ Poise. The integration limits are from $t_1$, the time at which the fiber enters the treatment region, to $t_2$, the time at which the fiber exits the treatment region. The relaxation time of the glass varies with temperature. At higher temperatures, the relaxation time is small, while at lower temperatures the relaxation time is large. Below a certain temperature, the viscosity of the glass is high enough that negligible relaxation takes place at these temperatures. The glass relaxation time scales linearly with the glass viscosity, which scales with the glass temperature. Because the glass experiences temperatures ranging from room temperature to 2000° C. during fiber drawing, and because cooling rates range from 1000° C./sec to 30000° C./sec during optical fiber drawing, stretched time t' provides an important method of accounting for relative relaxation of the glass at different temperatures. The stretched time accounts for different glass relaxation rates at different temperatures that the optical fiber experiences by scaling the relaxation at a given temperature to a reference temperature $T_{ref}$. By integrating over the total time in the draw process and by scaling the relaxation rates to a single reference temperature $T_{ref}$, as provided in Table 1 above, it is possible to compare different draw processes having different cooling rates. In various embodiments, the stretched residence time t' (with the choice of reference temperature corresponding to $\eta_{ref}$ of 2.56×10⁷ Poise) is greater than 0.006 s, greater than 0.01 s, or even greater than 0.02 s.

In various embodiments, treatment region 111 may include one or more slow cooling devices, each of which may include a furnace or a heated zone, adjusted in temperature, size, and environment, which provides a cooling rate and residence time in accordance with a pre-selected fiber draw speed. The fiber 105 may pass through the treatment region 111 without contacting a solid surface and may cool through radiative or conductive processes. The environment within the treatment region 111 may include a gas, inert or otherwise, which can serve as a heat transfer medium for receiving heat from the optical fiber as it cools. The type of gas may be selected on the basis of thermal conductivity to influence the rate or efficiency of heat transfer from the fiber. The gas employed in treatment region 111, for example, may have an average thermal conductivity less than or equal to, or less than, the average thermal conductivity of air over the operable temperature range of treatment region 111. Exemplary gases include, but are not limited to, argon, nitrogen, and air, or mixtures of two or more of these. The temperature of the treatment region 111 may be maintained at a level between room temperature and the average temperature of the fiber. Exemplary slow cooling devices are disclosed in U.S. Pat. Nos. 9,309,143; 10,221,089; 10,322,963; and 10,479,720, the contents of each of which are incorporated herein by reference.

Figure 3:
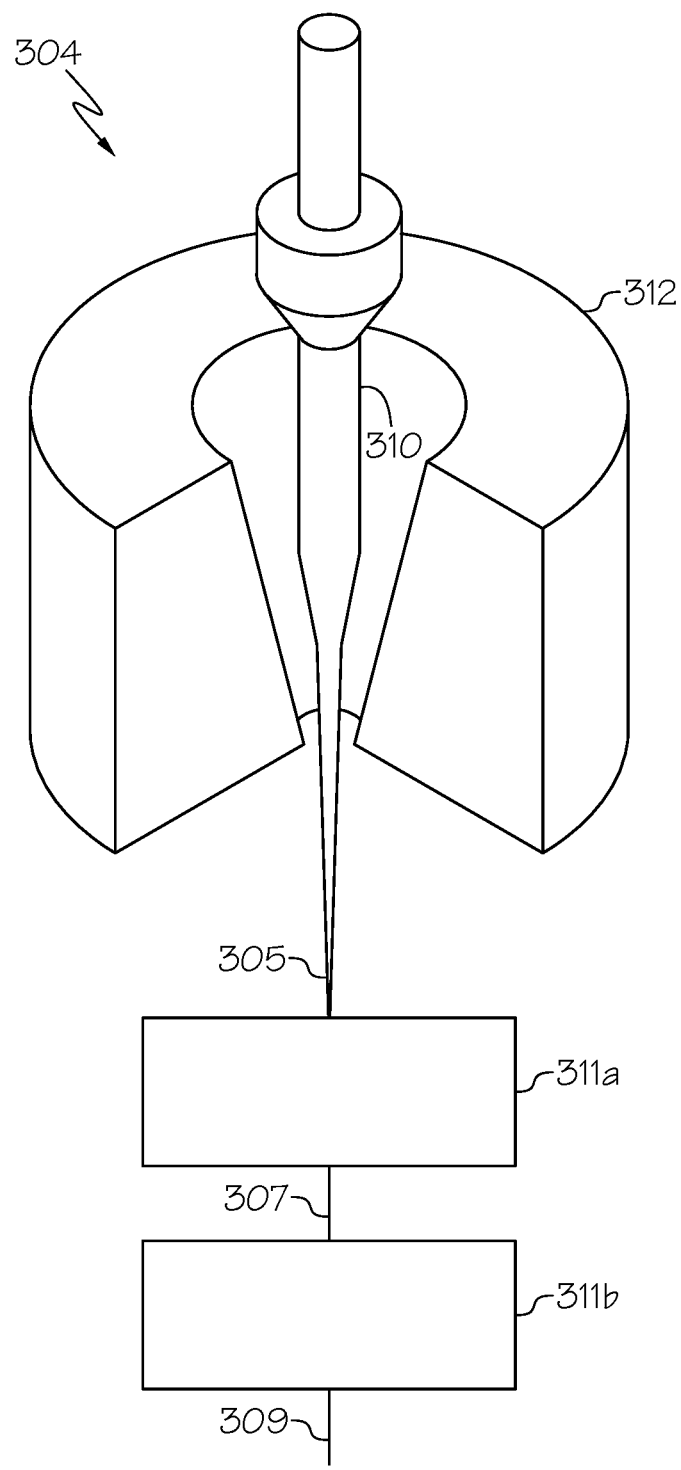
FIG. 3 schematically depicts an optical fiber production system with a glass heating source and two slow cooling devices.

In various embodiments, a single slow cooling device may be used, as shown in FIG. 1, to provide the desired residence time and cooling rate. In other embodiments, more than one slow cooling device, such as two slow cooling devices, may be used and arranged in-line such that the optical fiber passes from one of the slow cooling devices to another of the slow cooling devices. When more than one slow cooling device is used, the entire collection of cooling devices is referred to herein as the "treatment region" and the fiber entrance temperature $T_1$ and fiber exit temperature $T_2$ refer to the temperature at which the fiber enters the treatment region and exits the temperature region, respectively. Additionally, the residence time in such embodiments is the time during which the fiber is in the treatment region, regardless of the total number of slow cooling devices comprising the treatment region. FIG. 3 shows an embodiment having two in-line slow cooling devices. Production system 304 includes a glass heating source with furnace 312 and optical fiber preform 310. Preform 310 is formed with at least one halogen-doped core portion such that a fiber drawn therefrom has a halogen-doped core portion. The preform 310 is heated in furnace 312 to a temperature above its softening point and is drawn to form fiber 305 (i.e., the "formed fiber") having a temperature greater than or equal to the desired fiber entrance temperature $T_1$. Fiber 305 is directed to slow cooling device 311a, and is cooled at a cooling rate by circulating heated gas throughout the slow cooling device 311a, as described above, to produce fiber 307 having a temperature below the fiber entrance temperature $T_1$ and above the desired fiber exit temperature $T_2$ (i.e., the "cooled fiber"). Fiber 307 then passes into slow cooling device 311b and is cooled at a cooling rate by circulating heated gas throughout the slow cooling device 311b, as described above, to produce fiber 309 having the desired fiber exit temperature $T_2$. The position of slow cooling devices 311a, 311b relative to furnace 312, as well as the size or path length of slow cooling devices 311a, 311b may be adjusted to conform to the desired fiber entrance temperature $T_1$, fiber exit temperature $T_2$, residence time, and/or treatment rates. For example, the position of the slow cooling device 311a relative to the furnace 312 may be adjusted (such as by repositioning the slow cooling device 311) so that the fiber 305 cools in room temperature air to the fiber entrance temperature $T_1$ upon entering the slow cooling device 311a. In embodiments (not shown), slow cooling device 311a, 311b may be directly adjacent one another such that fiber 307 has negligible length.

Figure 4:
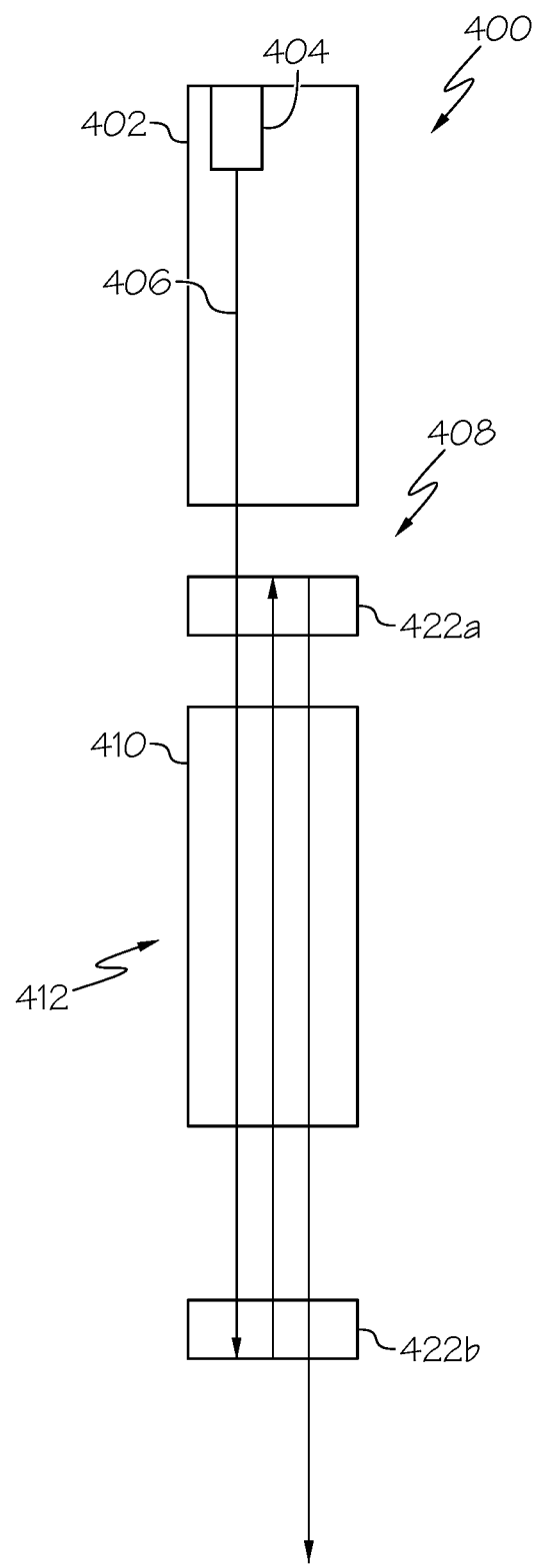
FIG. 4 schematically depicts an optical fiber production system allowing for redirection of the optical fiber multiple times through the same slow cooling device.

In yet other embodiments, the appropriate residence time and cooling rate may be achieved by redirecting the optical fiber through the same slow cooling device multiple times. In some embodiments, the optical fiber is directed through the same slow cooling device at least two times. In some embodiments, the optical fiber is directed through the same slow cooling device at least three times. An exemplary such system is shown in FIG. 4 and is described in U.S. Patent Application Ser. No. 62/976,545, filed Feb. 14, 2020, the entire content of which is incorporated by reference herein. The system 400 comprises a draw furnace 402. The draw furnace contains an optical fiber preform 404. Optical fiber 406 is drawn from the optical fiber preform 404. The fiber preform 404 is constructed of a glass, such as silica glass, and may include regions of different composition. Optical fiber preform 404, for example, may include regions of modified and unmodified silica glass with compositions corresponding to the core and cladding compositions desired for fibers drawn from the preform. The fiber preform 404 is heated in a furnace 402 and the optical fiber 406 drawn therefrom extends from the draw furnace 402 along a process pathway 408.

A slow cooling device 410 is operatively coupled to and downstream from the draw furnace 402 along a first segment 412 of the process pathway 408. The optical fiber 406 is redirected through the slow cooling device 410 via at least two fluid bearing devices 422a, 422b that are operatively coupled to and downstream from the draw furnace 402 along a first segment 412 of the process pathway 408. The fluid bearing devices 422a, 422b redirect the bare optical fiber 406 through the slow cooling device 410.

As noted above, processing conditions that lower the fictive temperature of optical fibers are desirable because optical fibers with low fictive temperatures exhibit low attenuation. The fictive temperature of an optical fiber may be lowered by allowing slow structural relaxation of the glass of the fiber, and the rate of this structural relaxation may, in turn, be influenced by controlling the cooling rate of the fiber during manufacture. As the cooling rate decreases, the time window in which the glass exhibits a viscosity in the range conducive to structural relaxation is increased, allowing the glass to approach an equilibrium structural state during cooling. The closer the temperature of the treatment region 111 is to the average temperature of the fiber, the slower is the cooling rate. Treatment region 111 may include a furnace with a heated zone having a temperature greater than or equal to 800° C. and less than or equal to 1600° C., greater than or equal to 850° C. and less than or equal to 1550° C., greater than or equal to 900° C. and less than or equal to 1500° C., greater than or equal to 950° C. and less than or equal to 1450° C., greater than or equal to 1000° C. and less than or equal to 1400° C., greater than or equal to 1050° C. and less than or equal to 1300° C., greater than or equal to 1100° C. and less than or equal to 1250° C., or even greater than or equal to 1150° C. and less than or equal to 1200° C. It should be understood that the temperature of the heated zone (also known as the slow cooling device process temperature) may be within a range formed from any one of the lower bounds for the temperature and any one of the upper bounds for the temperature described herein. For example, in embodiments, the heated zone has a temperature of greater than or equal to 900° C. and less than or equal to 1250° C.

In embodiments, the present method may further include redirecting the optical fiber after exiting the treatment region 111. The redirection may include diverting the fiber from one processing pathway to another processing pathway. Drawing of the fiber from the heated glass source (e.g. an optical fiber preform 110 in a furnace 112) may occur in a vertical downward direction, and the fiber 105 may be directed through the treatment region 111 in a substantially vertical direction. Redirection of the fiber 107 upon exit of the treatment region 111 may enable further cooling or processing in a non-vertical direction, such as a horizontal direction. Redirection of the fiber 107 upon exit of the treatment region 111 may involve changing the direction of the fiber 107 along its fiber path multiple times. Redirection of the fiber 107 is advantageous because it increases the effective processing path length without the need to increase the vertical space of the production facility.

Figure 5:
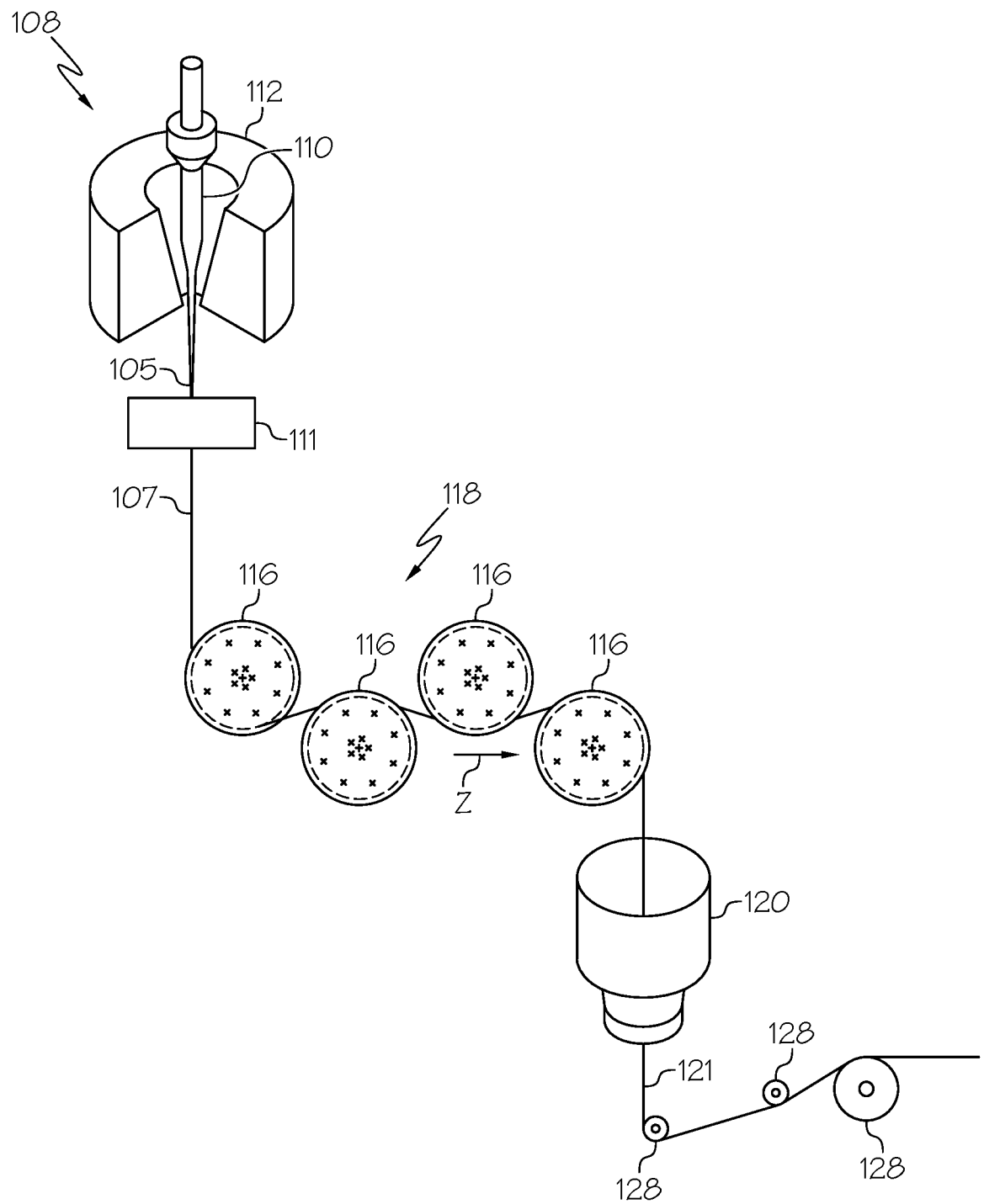
FIG. 5 schematically depicts an optical fiber production system with a glass heating source, a cooling stage, several fiber redirection devices, a coating apparatus and a drawing mechanism.

An apparatus for accomplishing redirection of the fiber is depicted schematically in FIG. 5. Optical fiber production system 108 includes furnace 112 for heating optical fiber preform 110 to a temperature above its softening point, which preform 110 is drawn to form fiber 105. Fiber 105 is directed to treatment region 111 to form fiber 107 as described above in connection with FIG. 1. Treatment region 111 is configured to reduce the average temperature of the fiber 107 in accordance with the ranges described above. Fiber 107 may be further directed through series 118 of redirection devices 116 and may be redirected from a vertical pathway to a more nearly horizontal pathway and back to a more nearly vertical pathway for delivery of the fiber to coating unit 120 to form coated fiber 121. The force to pull the fiber is provided by drawing mechanism 128, which may also be present in the production system 104 of FIG. 1.

Redirection of the fiber 107 may be accomplished by one or more redirection devices 116. Redirection devices include fluid bearing devices and air-turn devices. Fluid bearing devices and air-turn devices preserve the integrity of the fiber by accomplishing redirection of the fiber without making physical contact with the fiber. Instead, redirection is achieved with the force of a pressurized fluid. The fiber passes through a support channel contained within the fluid bearing or air-turn device. The fluid bearing or air-turn device may be circular and the fiber support channel may be formed along or within the circumference of the device. Pressurized fluid supplied from a groove or orifice at the bottom of the fiber support channel provides a force that repels the fiber from the surface of the channel to prevent physical contact. As the fluid or air passes around the fiber and exits the fiber support channel, it creates a pressure distribution that operates to retain the fiber in the center of the support channel via the Bernoulli effect. As a result, the fiber conforms to the fiber support channel and is guided in an arcuate direction defined by the fiber support channel to achieve redirection. The direction of the fiber may be changed from substantially vertical to substantially horizontal. The direction of the fiber may be changed by an angle less than 90°, an angle of 90°, an angle between 90° and 180°, or an angle of 180°. Illustrative redirection devices are described in U.S. Pat. Nos. 7,737,971; 8,074,474; 8,528,368; and 10,479,720; the disclosures of which are hereby incorporated by reference herein.

When implementing fiber redirection in embodiments described herein, the treatment region 111 described above may be placed upstream of a redirection device or upstream of the first of a series of redirection devices. Upstream placement of the treatment region 111 permits cooling of the fiber in the controlled temperature range and at the controlled cooling rate described above and avoids any cooling that may occur within the redirection device. Cooling rates well above 12,000° C./s, for example, are expected when a fiber passes through an air-turn device because of the convective heat removal that accompanies the high rate of air flow needed to provide the forces necessary to levitate the fiber. As indicated above, the rate of cooling following exit of the fiber from the treatment region 111 may be arbitrary.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of processing an optical fiber comprising:
   drawing the optical fiber from an optical fiber preform within a draw furnace, wherein the optical fiber extends from the draw furnace along a process pathway, and wherein the optical fiber comprises at least one halogen-doped core comprising a halogen concentration greater than or equal to 0.5 wt %; and
   drawing the optical fiber through at least one slow cooling device positioned downstream from the draw furnace at a draw speed, wherein:
   the at least one slow cooling device exposes the optical fiber to a slow cooling device process temperature greater than or equal to 800° C. and less than or equal to 1600° C.,
   the draw speed is such that the optical fiber has a residence time of at least 0.1 s in the at least one slow cooling device, and
   the optical fiber is drawn through the at least one slow cooling device at least two times.

2. The method of claim 1, wherein the at least one halogen-doped core comprises greater than or equal to 1.0 wt. % and less than or equal to 6.5 wt. % chlorine.

3. The method of claim 1, wherein the at least one halogen-doped core comprises greater than or equal to 0.5 wt. % and less than or equal to 4.0 wt. % bromine.

4. The method of claim 1, wherein the at least one halogen-doped core comprises at least two halogens.

5. The method of claim 1, wherein the slow cooling device process temperature is greater than or equal to 900° C. and less than or equal to 1250° C.

6. The method of claim 1, wherein the optical fiber has a residence time of at least 0.2 s in the at least one slow cooling device.

7. The method of claim 1, wherein the optical fiber has a residence time of at least 1.0 s in the at least one slow cooling device.

8. The method of claim 1, wherein the at least one slow cooling device exposes the optical fiber to a slow cooling device process temperature greater than or equal to 800° C. and less than or equal to 1500° C., and the draw speed is such that the optical fiber has a residence time of at least 0.5 s in the at least one slow cooling device.

9. The method of claim 1, wherein the draw speed is greater than or equal to 50 m/s.

10. The method of claim 1, wherein the at least one slow cooling device comprises at least two slow cooling devices arranged such that the optical fiber passes from one of the at least two slow cooling devices to another of the at least two slow cooling devices.

11. The method of claim 1, wherein the optical fiber after the drawing through the at least one slow cooling device has a fictive temperature of greater than or equal to 1300° C. and less than or equal to 1485° C.

12. The method of claim 1, wherein the optical fiber has an attenuation of <0.18 dB/km at a wavelength of 1550 nm.

* * * * *

UNITED STATES PATENT AND TRADEMARK OFFICE
CERTIFICATE OF CORRECTION

| | |
|---|---|
| PATENT NO. | : 11,802,070 B2 |
| APPLICATION NO. | : 17/308409 |
| DATED | : October 31, 2023 |
| INVENTOR(S) | : Steven Bruce Dawes et al. |

It is certified that error appears in the above-identified patent and that said Letters Patent is hereby corrected as shown below:

In the Claims

In Column 22, Line 18, in Claim 12, delete "<0.18" and insert -- ≤0.18 --.

Signed and Sealed this
Fourteenth Day of May, 2024

Katherine Kelly Vidal
*Director of the United States Patent and Trademark Office*